(12) United States Patent
Igawa

(10) Patent No.: US 10,462,314 B2
(45) Date of Patent: Oct. 29, 2019

(54) INFORMATION PROCESSING APPARATUS AND INFORMATION PROCESSING METHOD

(71) Applicant: Konica Minolta, Inc., Chiyoda-ku, Tokyo (JP)

(72) Inventor: Shin Igawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/967,941

(22) Filed: May 1, 2018

(65) Prior Publication Data

US 2018/0359379 A1    Dec. 13, 2018

(30) Foreign Application Priority Data

Jun. 9, 2017    (JP) .................................. 2017-114450

(51) Int. Cl.
*H04N 1/00* (2006.01)
*G06F 3/12* (2006.01)

(52) U.S. Cl.
CPC ....... *H04N 1/00517* (2013.01); *G06F 3/1204* (2013.01); *G06F 3/1231* (2013.01); *G06F 3/1255* (2013.01); *G06F 3/1257* (2013.01); *G06F 3/1285* (2013.01); *H04N 1/00411* (2013.01); *H04N 1/00474* (2013.01)

(58) Field of Classification Search
CPC ................................................ H04N 1/00517
See application file for complete search history.

(56) References Cited

U.S. PATENT DOCUMENTS

| | | | | |
|---|---|---|---|---|
| 6,452,692 B1 * | 9/2002 | Yacoub | ................. | G06F 3/1204 358/1.13 |
| 6,642,943 B1 * | 11/2003 | Machida | ............ | H04N 1/00408 358/1.15 |
| 7,861,172 B1 * | 12/2010 | Minagawa | ............ | G06F 3/1203 358/1.15 |
| 8,433,789 B2 * | 4/2013 | Nagatani | ............. | H04L 41/0806 358/1.15 |

(Continued)

FOREIGN PATENT DOCUMENTS

JP        2013-145588        7/2013

*Primary Examiner* — Ted W Barnes
(74) *Attorney, Agent, or Firm* — Squire Patton Boggs (US) LLP

(57) ABSTRACT

An information processing apparatus is capable of setting favorite function information in an image forming apparatus, the information processing apparatus including: a collector that collects function setting item information from models of image forming apparatuses; a candidate selector that selects combinations of candidates of the function setting item information to be included in the favorite function information from the function setting item information and sets a specified function to each of the selected candidates of the function setting item information; an availability display that displays availability in the models of image forming apparatuses, of each of the specified functions of the candidates of the function setting item information selected and set by the candidate selector; and a storage that stores, a combination of allowed candidates, of the combinations of the candidates of the function setting item information to which the specified functions displayed in the availability display have been set.

4 Claims, 17 Drawing Sheets

(56) References Cited

U.S. PATENT DOCUMENTS

| | | | | |
|---|---|---|---|---|
| 8,854,669 B1* | 10/2014 | Jazayeri | ............... | G06F 3/1204 358/1.15 |
| 2002/0194180 A1* | 12/2002 | Alsop | ............... | G03G 15/5075 |
| 2003/0033395 A1* | 2/2003 | Sato | ............... | G06F 3/1204 709/223 |
| 2004/0008366 A1* | 1/2004 | Ferlitsch | ............... | G06K 15/00 358/1.15 |
| 2004/0179230 A1* | 9/2004 | Kitada | ............... | H04N 1/00954 358/1.15 |
| 2004/0212829 A1* | 10/2004 | Uchida | ............... | G06F 9/4411 358/1.15 |
| 2005/0046886 A1* | 3/2005 | Ferlitsch | ............... | G06F 3/1206 358/1.13 |
| 2005/0060649 A1* | 3/2005 | Kimura | ............... | G06F 3/1204 715/274 |
| 2005/0146755 A1* | 7/2005 | Shimokawa | ....... | H04N 1/00416 358/453 |
| 2008/0246988 A1* | 10/2008 | Ashton | ............... | G06F 3/1204 358/1.15 |
| 2009/0251728 A1* | 10/2009 | Fukasawa | ............ | G06F 3/1204 358/1.15 |
| 2010/0250738 A1* | 9/2010 | Nagatani | ............ | H04L 41/0806 709/224 |
| 2011/0102833 A1* | 5/2011 | Torii | ............... | H04N 1/4433 358/1.15 |
| 2011/0188064 A1* | 8/2011 | Awata | ............... | G06F 3/12 358/1.13 |
| 2012/0194844 A1* | 8/2012 | Natori | ............... | G06F 3/1205 358/1.13 |
| 2013/0016377 A1* | 1/2013 | Meiyappan | ............ | G06F 3/121 358/1.9 |
| 2013/0201518 A1* | 8/2013 | Pan | ............... | G06F 3/1204 358/1.15 |
| 2013/0301080 A1* | 11/2013 | Nakata | ............... | G06F 3/1204 358/1.15 |
| 2013/0308165 A1* | 11/2013 | Venkatesh | ............ | G06F 3/1205 358/1.15 |
| 2014/0226179 A1* | 8/2014 | Minagawa | ............ | G06F 3/1204 358/1.15 |
| 2014/0331164 A1* | 11/2014 | Enomoto | ............ | H04N 1/00307 715/771 |
| 2015/0169267 A1* | 6/2015 | Hirakawa | ............ | G06F 3/1225 358/1.13 |
| 2016/0352960 A1* | 12/2016 | Morita | ............... | H04N 1/32101 |
| 2017/0085694 A1* | 3/2017 | Shibao | ............... | H04M 1/7253 |

* cited by examiner

FIG. 5

| SETTING ITEM | MODEL 01 | MODEL 02 | MODEL 03 |
|---|---|---|---|
| N in 1 | OFF/2 in 1/4 in 1 | OFF/2 in 1/4 in 1 | OFF/2 in 1/4 in 1 |
| SINGLE-SIDED/ DOUBLE-SIDED | SINGLE-SIDED/ DOUBLE-SIDED | – (SINGLE-SIDED) | SINGLE-SIDED/ DOUBLE-SIDED |
| STAPLE | OFF/ONE POINT LEFT/ TWO POINTS LEFT | OFF/ONE POINT LEFT/ TWO POINTS LEFT | – (OFF) |
| PUNCHING | OFF/ON | – (OFF) | OFF/ON |
| COLOR SETTING | COLOR/GRAY SCALE | COLOR/GRAY SCALE | – (GRAY SCALE) |
| IMAGE QUALITY | NORMAL/ HIGH IMAGE QUALITY | NORMAL/ HIGH IMAGE QUALITY | – (NORMAL) |
| TONER SAVING | OFF/ON | – (OFF) | – (OFF) |

FIG. 6

| SETTING ITEM | SETTING VALUE | REQUIRED/ RECOMMENDED |
|---|---|---|
| FAVORITE NAME | FAVORITE 1 | – |
| N in 1 | 2 in 1 | ●REQUIRED |
| SINGLE-SIDED/ DOUBLE-SIDED | DOUBLE-SIDED | ●REQUIRED |
| STAPLE | OFF | RECOMMENDED |
| PUNCHING | OFF | RECOMMENDED |
| COLOR SETTING | GRAY SCALE | ●REQUIRED |
| IMAGE QUALITY | NORMAL | RECOMMENDED |
| TONER SAVING | ON | RECOMMENDED |

FIG. 7

| SETTING ITEM | SETTING OF ADMINISTRATOR | | MODEL 01 | MODEL 02 | MODEL 03 |
|---|---|---|---|---|---|
| | SETTING VALUE | REQUIRED/ RECOMMENDED | | | |
| FAVORITE NAME | FAVORITE 1 | – | FAVORITE 1 | FAVORITE 1 | FAVORITE 1 |
| N in 1 | 2 in 1 | ●REQUIRED | OFF/2 in 1/4 in 1 | OFF/2 in 1/4 in 1 | OFF/2 in 1/4 in 1 |
| SINGLE-SIDED/ DOUBLE-SIDED | DOUBLE-SIDED | ●REQUIRED | SINGLE-SIDED/ DOUBLE-SIDED | – (SINGLE-SIDED) | SINGLE-SIDED/ DOUBLE-SIDED |
| STAPLE | OFF | RECOMMENDED | OFF/ONE POINT LEFT/ TWO POINTS LEFT | OFF/ONE POINT LEFT/ TWO POINTS LEFT | – (OFF) |
| PUNCHING | OFF | RECOMMENDED | OFF/ON | – (OFF) | OFF/ON |
| COLOR SETTING | GRAY SCALE | ●REQUIRED | COLOR/GRAY SCALE | COLOR/GRAY SCALE | – (GRAY SCALE) |
| IMAGE QUALITY | NORMAL | RECOMMENDED | NORMAL/ HIGH IMAGE QUALITY | NORMAL/ HIGH IMAGE QUALITY | – (NORMAL) |
| TONER SAVING | ON | RECOMMENDED | OFF/ON | – (OFF) | – (OFF) |

FIG. 8

| SETTING ITEM | SETTING OF ADMINISTRATOR | | MODEL 01 | MODEL 02 | MODEL 03 |
|---|---|---|---|---|---|
| | SETTING VALUE | REQUIRED/ RECOMMENDED | | | |
| FAVORITE NAME | FAVORITE 1 | - | FAVORITE 1 | - (NON-DISPLAY) | FAVORITE 1+ |
| N in 1 | 2 in 1 | ●REQUIRED | 2 in 1 | | 2 in 1 |
| SINGLE-SIDED/ DOUBLE-SIDED | DOUBLE-SIDED | ●REQUIRED | DOUBLE-SIDED | | DOUBLE-SIDED |
| STAPLE | OFF | RECOMMENDED | OFF | | OFF |
| PUNCHING | OFF | RECOMMENDED | OFF | | OFF |
| COLOR SETTING | GRAY SCALE | ●REQUIRED | GRAY SCALE | | GRAY SCALE |
| IMAGE QUALITY | NORMAL | RECOMMENDED | NORMAL | | NORMAL |
| TONER SAVING | ON | RECOMMENDED | ON | | OFF |

FIG. 11

| SETTING ITEM | SETTING VALUE | REQUIRED/ RECOMMENDED |
|---|---|---|
| FAVORITE NAME | FAVORITE 2 | – |
| N in 1 | 2 in 1 | ●REQUIRED |
| SINGLE-SIDED/ DOUBLE-SIDED | DOUBLE-SIDED | RECOMMENDED |
| STAPLE | ONE POINT LEFT | RECOMMENDED |
| PUNCHING | OFF | RECOMMENDED |
| COLOR SETTING | COLOR | RECOMMENDED |
| IMAGE QUALITY | HIGH IMAGE QUALITY | RECOMMENDED |
| TONER SAVING | OFF | ●REQUIRED |

FIG. 12

| SETTING ITEM | SETTING OF ADMINISTRATOR | | MODEL 01 | MODEL 02 | MODEL 03 |
|---|---|---|---|---|---|
| | SETTING VALUE | REQUIRED/ RECOMMENDED | | | |
| FAVORITE NAME | FAVORITE 2 | – | FAVORITE 2 | FAVORITE 2 | FAVORITE 2 |
| N in 1 | 2 in 1 | ●REQUIRED | OFF/2 in 1/4 in 1 | OFF/2 in 1/4 in 1 | OFF/2 in 1/4 in 1 |
| SINGLE-SIDED/ DOUBLE-SIDED | DOUBLE-SIDED | RECOMMENDED | SINGLE-SIDED/ DOUBLE-SIDED | – (SINGLE-SIDED) | SINGLE-SIDED/ DOUBLE-SIDED |
| STAPLE | ONE POINT LEFT | RECOMMENDED | OFF/ONE POINT LEFT/ TWO POINTS LEFT | OFF/ONE POINT LEFT/ TWO POINTS LEFT | – (OFF) |
| PUNCHING | OFF | RECOMMENDED | OFF/ON | – (OFF) | OFF/ON |
| COLOR SETTING | COLOR | RECOMMENDED | COLOR/GRAY SCALE | COLOR/GRAY SCALE | – (GRAY SCALE) |
| IMAGE QUALITY | HIGH IMAGE QUALITY | RECOMMENDED | NORMAL/ HIGH IMAGE QUALITY | NORMAL/ HIGH IMAGE QUALITY | – (NORMAL) |
| TONER SAVING | OFF | ●REQUIRED | OFF/ON | – (OFF) | – (OFF) |

FIG. 13

| SETTING ITEM | SETTING OF ADMINISTRATOR | | MODEL 01 | MODEL 02 | MODEL 03 |
|---|---|---|---|---|---|
| | SETTING VALUE | REQUIRED/ RECOMMENDED | | | |
| FAVORITE NAME | FAVORITE 2 | – | FAVORITE 2 | FAVORITE 2+ | – (NON-DISPLAY) |
| N in 1 | 2 in 1 | ●REQUIRED | 2 in 1 | 2 in 1 | |
| SINGLE-SIDED/ DOUBLE-SIDED | DOUBLE-SIDED | RECOMMENDED | DOUBLE-SIDED | SINGLE-SIDED | |
| STAPLE | ONE POINT LEFT | RECOMMENDED | ONE POINT LEFT | ONE POINT LEFT | |
| PUNCHING | OFF | RECOMMENDED | OFF | OFF | |
| COLOR SETTING | COLOR | RECOMMENDED | COLOR | COLOR | |
| IMAGE QUALITY | HIGH IMAGE QUALITY | RECOMMENDED | HIGH IMAGE QUALITY | HIGH IMAGE QUALITY | |
| TONER SAVING | OFF | ●REQUIRED | OFF | OFF | |

FIG. 14

| | SETTING AVAILABILITY | | RESULT | |
|---|---|---|---|---|
| | REQUIRED SPECIFICATION | RECOMMENDED SPECIFICATION | FAVORITE DISPLAY | SETTING VALUE CHANGE |
| TYPE A | ○ ALL ARE SETTABLE | ○ ALL ARE SETTABLE | ○ DISPLAY | ○ NO CHANGE |
| TYPE B | × THERE IS UNAVAILABLE SETTING | ○ × | × NON-DISPLAY | – |
| TYPE C | ○ ALL ARE SETTABLE | × THERE IS UNAVAILABLE SETTING | ○ DISPLAY | × THERE IS CHANGE |
| TYPE D | ○ ALL ARE SETTABLE | ○ × | × NON-DISPLAY | – |

FIG. 15

| | TYPE A | TYPE B | TYPE C | TYPE D | TOTAL |
|---|---|---|---|---|---|
| FAVORITE 1 | 8 | 1 | 1 | 0 | 10 |
| FAVORITE 2 | 8 | 0 | 1 | 1 | 10 |
| FAVORITE 3 | 0 | 5 | 0 | 5 | 10 |

FIG. 17

| SETTING ITEM | SETTING VALUE | REQUIRED/ RECOMMENDED |
|---|---|---|
| FAVORITE NAME | FAVORITE 1 | – |
| N in 1 | 2 in 1 | ●REQUIRED |
| SINGLE-SIDED/ DOUBLE-SIDED | DOUBLE-SIDED | ●REQUIRED |
| STAPLE | OFF | RECOMMENDED |
| PUNCHING | OFF | RECOMMENDED |
| COLOR SETTING | GRAY SCALE | ●REQUIRED |
| IMAGE QUALITY | NORMAL | RECOMMENDED |
| TONER SAVING | ON | RECOMMENDED |
| MODEL | MODEL 01 | ●REQUIRED |

FIG. 18

| SETTING ITEM | SETTING OF ADMINISTRATOR | | MODEL 01 | MODEL 02 | MODEL 03 |
|---|---|---|---|---|---|
| | SETTING VALUE | REQUIRED/ RECOMMENDED | | | |
| FAVORITE NAME | FAVORITE 1 | – | FAVORITE 1 | – (NON-DISPLAY) | – (NON-DISPLAY) |
| N in 1 | 2 in 1 | ●REQUIRED | 2 in 1 | | |
| SINGLE-SIDED/ DOUBLE-SIDED | DOUBLE-SIDED | ●REQUIRED | DOUBLE-SIDED | | |
| STAPLE | OFF | RECOMMENDED | OFF | | |
| PUNCHING | OFF | RECOMMENDED | OFF | | |
| COLOR SETTING | GRAY SCALE | ●REQUIRED | GRAY SCALE | | |
| IMAGE QUALITY | NORMAL | RECOMMENDED | NORMAL | | |
| TONER SAVING | ON | RECOMMENDED | ON | | |

FIG. 19

| SETTING ITEM | SETTING VALUE | REQUIRED/ RECOMMENDED |
|---|---|---|
| FAVORITE NAME | FAVORITE 1 | – |
| N in 1 | 2 in 1 | ●REQUIRED |
| SINGLE-SIDED/ DOUBLE-SIDED | DOUBLE-SIDED | ●REQUIRED |
| STAPLE | OFF | RECOMMENDED |
| PUNCHING | OFF | RECOMMENDED |
| COLOR SETTING | GRAY SCALE | ●REQUIRED |
| IMAGE QUALITY | NORMAL | RECOMMENDED |
| TONER SAVING | ON | RECOMMENDED |
| USER | GROUP A MEMBER | ●REQUIRED |

INFORMATION PROCESSING APPARATUS AND INFORMATION PROCESSING METHOD

The entire disclosure of Japanese patent Application No. 2017-114450, filed on Jun. 9, 2017, is incorporated herein by reference in its entirety.

BACKGROUND

Technological Field

This disclosure relates to an information processing apparatus and an information processing method.

Description of the Related Art

In an image forming apparatus such as a multi-functional peripheral (MFP), a number of functions is provided as functions settable when printing is performed by a copy function, a printer function, or the like. In the image forming apparatus, a favorite function can be registered with a printer driver. The favorite function is a function to select in advance a combination of pieces of favorite setting item information (for example, various types of function setting item information such as a printing surface and image quality) of a user, such as a function considered to be frequently used, and to set in advance specified functions (for example, specified functions of double-sided/single-sided printing, low image quality/high image quality, and the like) in the various types of function setting item information.

Such an image forming apparatus is sometimes used as a shared image forming apparatus by a group of users of a plurality of personal computers (PC) connected via a network. The favorite function required in the image forming apparatus often varies depending on a type of occupation or the like of a user group.

An administrator (such as an IT administrator) who manages a plurality of image forming apparatuses used by various user groups is requested to register the favorite function according with the purpose of use of the image forming apparatus in each user group to a printer driver for using the image forming apparatus shared by the user group. The administrator can improve the efficiency of management work by using a printer driver commonly usable by various image forming apparatuses, such as a universal printer driver (UPD), for the plurality of image forming apparatuses to be managed.

As a conventional information processing apparatus to which the favorite function is settable, there is an information processing apparatus capable of collectively setting combinations of items of print setting conditions that can be commonly used in a plurality of image forming apparatuses (JP 2013-145588 A).

However, the conventional information processing apparatus as disclosed in JP 2013-145588 A cannot confirm whether each item (corresponding to an item of the favorite function) of print setting conditions collectively set to the plurality of image forming apparatuses is a function that can be used in each of the image forming apparatuses. Therefore, there is a possibility that favorite function information including a print setting condition that cannot be used in any of the image forming apparatuses is registered.

SUMMARY

The present disclosure has been devised in view of the above circumstances, and an object thereof is to prevent registration of favorite function information that cannot be used in an image forming apparatus to which favorite function information is to be set.

To achieve the abovementioned object, according to an aspect of the present invention, there is provided an information processing apparatus, reflecting one aspect of the present invention, capable of setting favorite function information in an image forming apparatus, wherein the information processing apparatus comprises: a collector that collects function setting item information from a plurality of models of image forming apparatuses; a candidate selector that is capable of selecting combinations of candidates of the function setting item information to be included in the favorite function information from the function setting item information collected by the collector and setting a specified function to each of the selected candidates of the function setting item information; an availability display that displays availability in the plurality of models of image forming apparatuses, of each of the specified functions of the candidates of the function setting item information selected and set by the candidate selector; and a storage that is capable of storing, as favorite setting information to be set as the favorite function information in the plurality of models of image forming apparatuses, a combination of allowed candidates, of the combinations of the candidates of the function setting item information to which the specified functions displayed in the availability display have been set.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a display screen view illustrating a display example of an information collection result table;

FIG. 6 is a display screen view illustrating a display example of a favorite function information candidate table;

FIG. 7 is a display screen view illustrating a display example of a first favorite setting result information table;

FIG. 8 is a display screen view illustrating a display example of a second favorite setting result information table;

FIG. 11 is a display screen view illustrating a display example of a favorite function information candidate table according to another example of the favorite function information example;

FIG. 12 is a display screen view illustrating a display example of a first favorite setting result information table corresponding to "favorite 2";

FIG. 13 is a display screen view illustrating a display example of a second favorite setting result information table corresponding to "favorite 2";

FIG. 14 is a type classification table used when classifying setting items of favorite function information candidates into a plurality of types;

FIG. 15 is a display screen view illustrating a favorite setting result information by type table illustrating setting items of favorite function information candidates classified into a plurality of types;

FIG. 17 is a view illustrating setting items of favorite function information when setting favorite function information of only a specific model;

FIG. 18 is a view illustrating a second favorite setting result information table of favorite function information when setting favorite function information of only a specific model; and FIG. 19 is a view illustrating setting items of favorite function information when setting favorite function information of only a specific user.

DETAILED DESCRIPTION OF EMBODIMENTS

Figure 1:
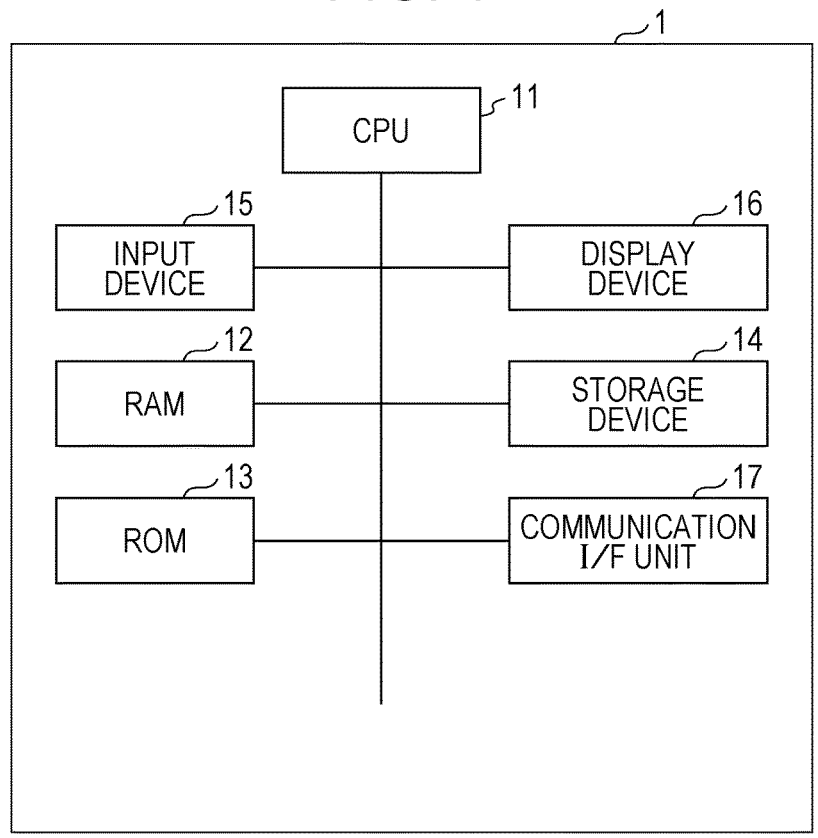
FIG. 1 is a block diagram illustrating a configuration of an administrator PC as an information processing apparatus that can create and set favorite function information.

Hereinafter, one or more embodiments of an information processing apparatus of the present invention will be described with reference to the drawings. However, the scope of the invention is not limited to the disclosed embodiments. In the following description, the same parts and constituent elements are denoted by the same reference numerals. Names and functions of the same parts and constituent elements are also the same. Therefore, description of the same parts and constituent elements will not be repeated.

[Configuration of Information Processing Apparatus]

FIG. 1 is a block diagram illustrating a configuration of an administrator personal computer (PC) 1 as an information processing apparatus that can create and set favorite function information. A favorite function is a function to select in advance a combination of pieces of favorite setting item information (for example, various types of function setting item information such as a printing surface and image quality) of a user, such as a function considered to be frequently used, and to set in advance specified functions (for example, specified functions of double-sided/single-sided printing, low image quality/high image quality, and the like) in the various types of function setting item information.

An administrator PC 1 is a computer including a CPU 11, a RAM 12, a ROM 13, a storage device 14, an input device 15, a display device 16, a communication interface (I/F) unit 17, and the like. The storage device 14 is configured by a storage such as a hard disk drive (HDD). The input device 15 is configured by an inputter such as a keyboard and a mouse. The display device 16 is configured by a display such as a liquid crystal display. The communication I/F unit 17 is configured by an interface such as an input/output interface circuit connectable to a communication line such as a LAN.

In the administrator PC 1, the CPU 11 realizes various processing units by executing an information processing program (hereinafter, also simply referred to as a program) that is a predetermined software program stored in the ROM 13 or the storage device 14. Note that the program (a program module group in details) may be recorded on a portable recording medium such as a USB memory and installed in the image forming apparatus 1 via the recording medium. Alternatively, the program may be downloaded via a network or the like and installed in the image forming apparatus 1.

[Schematic Configuration of Network System]

Figure 2:
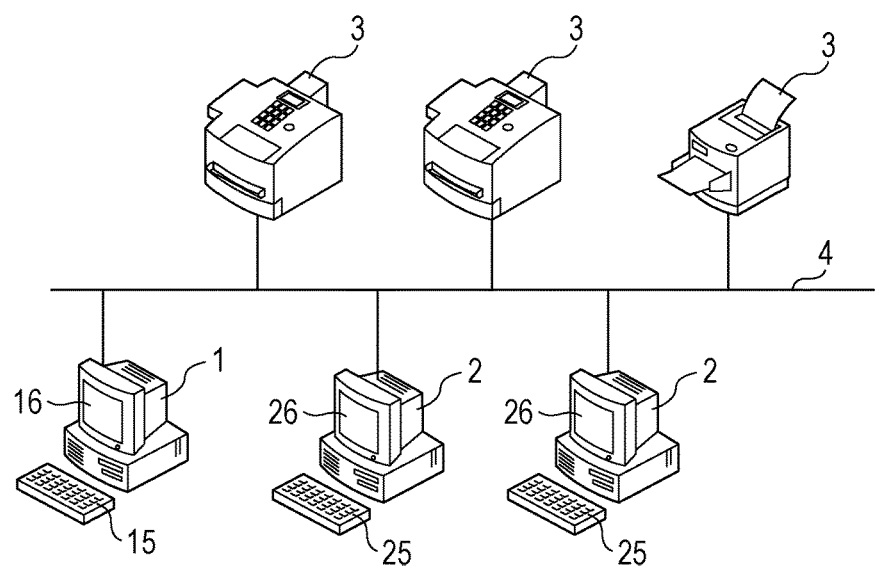
FIG. 2 is a network diagram illustrating a schematic configuration of a network system to which the administrator PC, a user PC, and an image forming apparatus are connected.

FIG. 2 is a network diagram illustrating a schematic configuration of a network system to which the administrator PC 1, a user PC 2, and an image forming apparatus 3 are connected. The user PC 2 is a PC used by the user and has a similar configuration to the administrator PC 1 illustrated in FIG. 1. The image forming apparatus 3 is an apparatus that forms an image by a scan function, a copy function, a printer function, a facsimile function, or the like. An example of the image forming apparatus 3 includes a multi-functional peripheral (MFP) that is a multifunctional machine multifunctionally including the scan function, the copy function, the printer function, the facsimile function, and the like.

The image forming apparatus 3 includes an image reader, a print output unit, a communication unit, an operation unit, a storage unit, a control unit, and the like, and realizes various functions by multifunctionally operating these parts. The image reading unit is a processor that optically reads (scans) a document placed at a predetermined position of the image forming apparatus 3 and generates image data of the document. The print output unit is a processor that prints and outputs an image on various media such as paper on the basis of data regarding an object to be printed. The communication unit is a processor capable of performing data communication via a communication line such as a LAN. The storage unit is configured by a storage device such as a hard disk drive (HDD). The operation unit includes an operation input unit that receives an operation input to the image forming apparatus 3 and a display unit that displays and outputs various types of information. The control unit is a control device incorporated in the image forming apparatus 1 and which controls the image reading unit, the print output unit, the communication unit, the operation unit, and the storage unit to generally control the image forming apparatus 3 by executing the information processing program.

As illustrated in FIG. 2, the administrator PC 1, the user PC 2, and the image forming apparatus 3 are information-communicatively connected via a LAN 4 to configure a network system that is an object to be managed by the administrator. Note that the user PC 2 and the image forming apparatus 3 may be information-communicatively configured by connecting a printer cable between terminals such as USB terminals respectively provided in the user PC 2 and the image forming apparatus 3. In each of the administrator PC 1 and the user PC 2, a printer driver, which is driver software for operating the image forming apparatus 3, is installed.

Each of the administrator PC 1 and the user PC 2 performs various settings for operating the image forming apparatus 3 in the printer driver, and operates the image forming apparatus 3 specified on the basis of the settings in response to an instruction for execution of the operation. With the operation, the administrator PC 1 and the user PC 2 can cause the image forming apparatus 3 to execute the operation by the scan function, the copy function, the printer function, or the facsimile function.

[Detailed Configuration of Network System]

Figure 3:
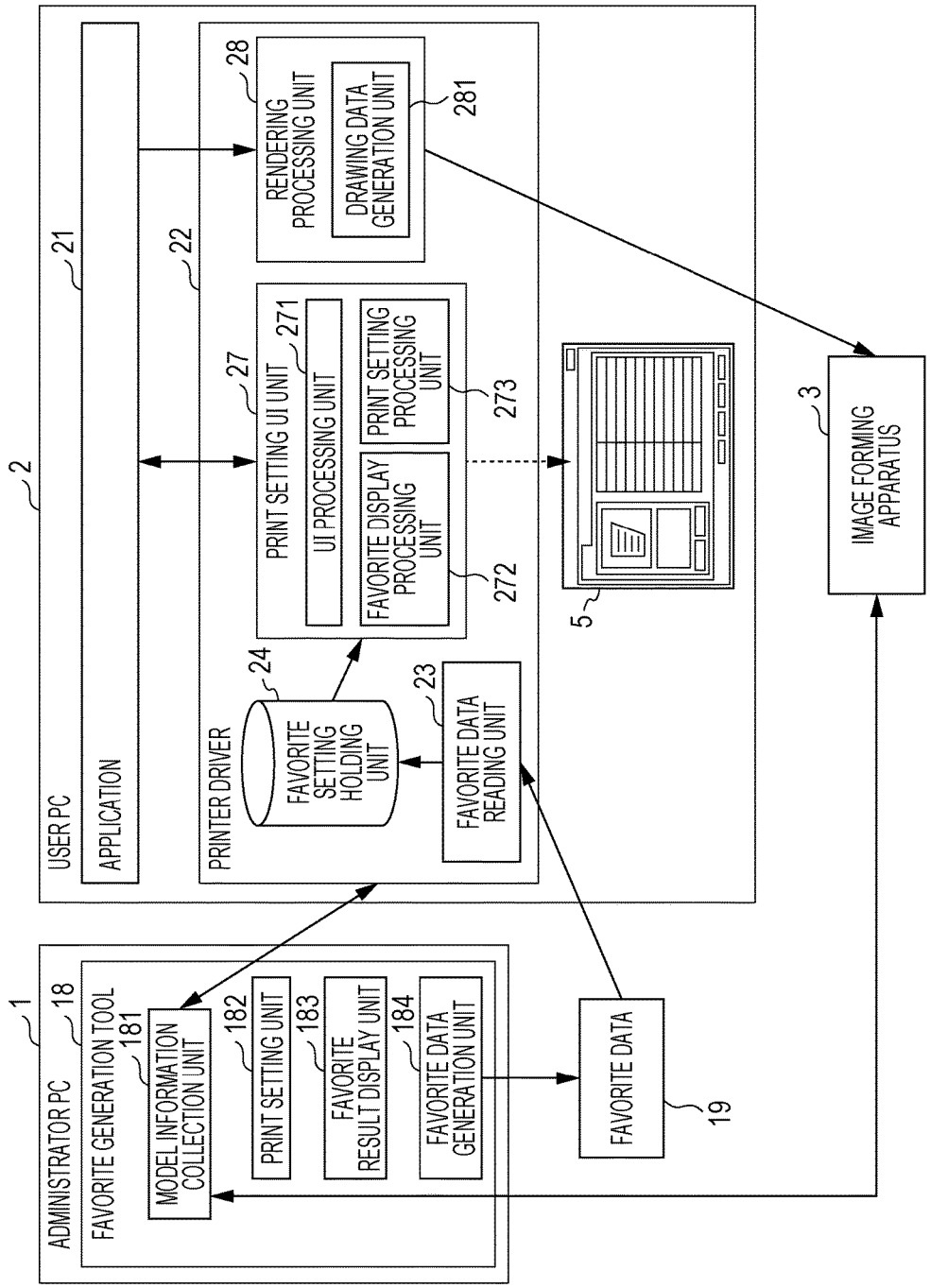
FIG. 3 is a block diagram illustrating a detailed configuration of the network system to which the administrator PC, the user PC, and the image forming apparatus are connected.

FIG. 3 is a block diagram illustrating a detailed configuration of the network system to which the administrator PC 1, the user PC 2, and the image forming apparatus 3 are connected. In FIG. 3, functions relating to generation and setting of favorite function information are mainly illustrated and other functions are omitted as appropriate.

In the user PC 2, an application 21 that is a software program executed when causing the image forming apparatus 3 to perform an operation such as printing, and a printer driver 22 are stored in a storage device and installed.

The printer driver 22 includes a favorite data reading unit 23, a favorite setting holding unit 24, a print setting UI (user interface) unit 27, and a rendering processing unit 28. In the user PC 2, a CPU executes information processing programs that are software programs stored in a ROM, a storage device, and the like to realize the data reading unit 23, the favorite setting holding unit 24, the print setting UI unit 27, and the rendering processing unit 28.

In the administrator PC 1, a favorite generation tool 18, which is a software program executed when creating favorite function information, is stored in the storage device 14 and installed. The favorite generation tool 18 includes a model information collection unit 181, a print setting unit 182, a favorite result display unit 183, and a favorite data generation unit 184. In the administrator PC 1, a CPU executes information processing programs that are software programs stored in a ROM, a storage device 14, and the like to realize the model information collection unit 181, the print setting unit 182, the favorite result display unit 183, and the favorite data generation unit 184.

When creating the favorite function information of the printer function using the favorite generation tool 18, the model information collection unit 181 communicates with the printer drivers of all the user PCs 2 connected to the LAN 4 of the network system to be managed, and collects and acquires setting information of print functions of all the image forming apparatuses 3 used by the user PCs 2. Note that the model information collection unit 181 may communicate with all the image forming apparatuses 3 used by the user PC 2 connected to the LAN 4 of the network system to be managed, and may collect and acquire the setting information of the print functions of the image forming apparatuses 3.

The print setting unit 182 displays the setting information of the print functions collected and acquired by the model information collection unit 181 in the form of a list on the display device 16 (see FIG. 5), and makes setting values (specification information) of the displayed setting information of the print functions specifiable on the basis of an operation of the input device 15 by the administrator. The print setting unit 182 sets a combination of candidates and the setting information for the favorite function information on the basis of the operation of the input device 15 by the administrator (see FIG. 6).

The favorite result display unit 183 displays favorite setting result information on the display device 16, the favorite setting result information showing a combination of the favorite function information composed of the combination of the setting information (setting items) of the print functions set by the administrator in the print setting unit 182 and a specification result of the setting values of the setting information in the form of a list (see FIGS. 7 and 8). The administrator confirms the favorite setting result information displayed in this manner, and determines whether registering the information as the favorite function information.

The favorite data generation unit 184 generates the favorite function information by registering (storing) the determined favorite setting result information to the storage device 14 as the favorite function information when a predetermined registration operation is made on the basis of the operation of the input device 15 by the administrator who has confirmed the favorite setting result information displayed by the favorite result display unit 183. The favorite function information generated by the favorite data generation unit 184 is output from the communication I/F unit 17 as favorite data 19 and is transmittable to the user PC 2 via the LAN 4.

In the user PC 2, the application 21 that is a software program executed when causing the image forming apparatus 3 to perform an operation such as printing, and the printer driver 22 are stored in a storage device and installed.

The printer driver 22 includes the favorite data reading unit 23, the favorite setting holding unit 24, the print setting UI (user interface) unit 27, and the rendering processing unit 28. In the user PC 2, the CPU executes the information processing programs that are software programs stored in the ROM, and the like to realize the favorite data reading unit 23, the favorite setting holding unit 24, the print setting UI unit 27, and the rendering processing unit 28.

The favorite data reading unit 23 reads the favorite data 19 generated in the administrator PC 1 and transmitted from the administrator PC 1 via the LAN 4 to the printer driver 22. The favorite function information indicated by the favorite data 19 read by the favorite data reading unit 23 is held (stored) in the favorite setting holding unit 24. As a result, the favorite function information generated in the administrator PC 1 becomes available in the user PC 2.

The print setting UI unit 27 is a unit that displays a print setting screen visually recognizable by the user on the display device of the user PC 2, and determines print setting and changes the print setting in response to an operation of the input device by the user, and includes a user interface (UI) unit 271, a favorite function display unit 272, and a print setting processing unit 273. The UI unit 271 displays a print setting screen 5 on the display unit, and the favorite function display unit 272 reads and displays, on the display device, the favorite functions held in the favorite setting holding unit 24 in response to an instruction from the application 21 according to the operation of the input device by the user. Then, the print setting processing unit 273 executes specific processing regarding the print setting such as determination of the print setting and change of the print setting in response to an instruction from the application 21 according to the operation of the input device by the user.

The rendering processing unit 28 is a unit that convers, in response to an print instruction from the application 21, the print instruction into data interpretable by the image forming apparatus 3, and a drawing data generation unit 281 generates drawing data for printing and transmits the drawing data to the image forming apparatus 3. The image forming apparatus 3 executes printing according to the drawing data transmitted from the user PC 2 as described above.

Figure 4:
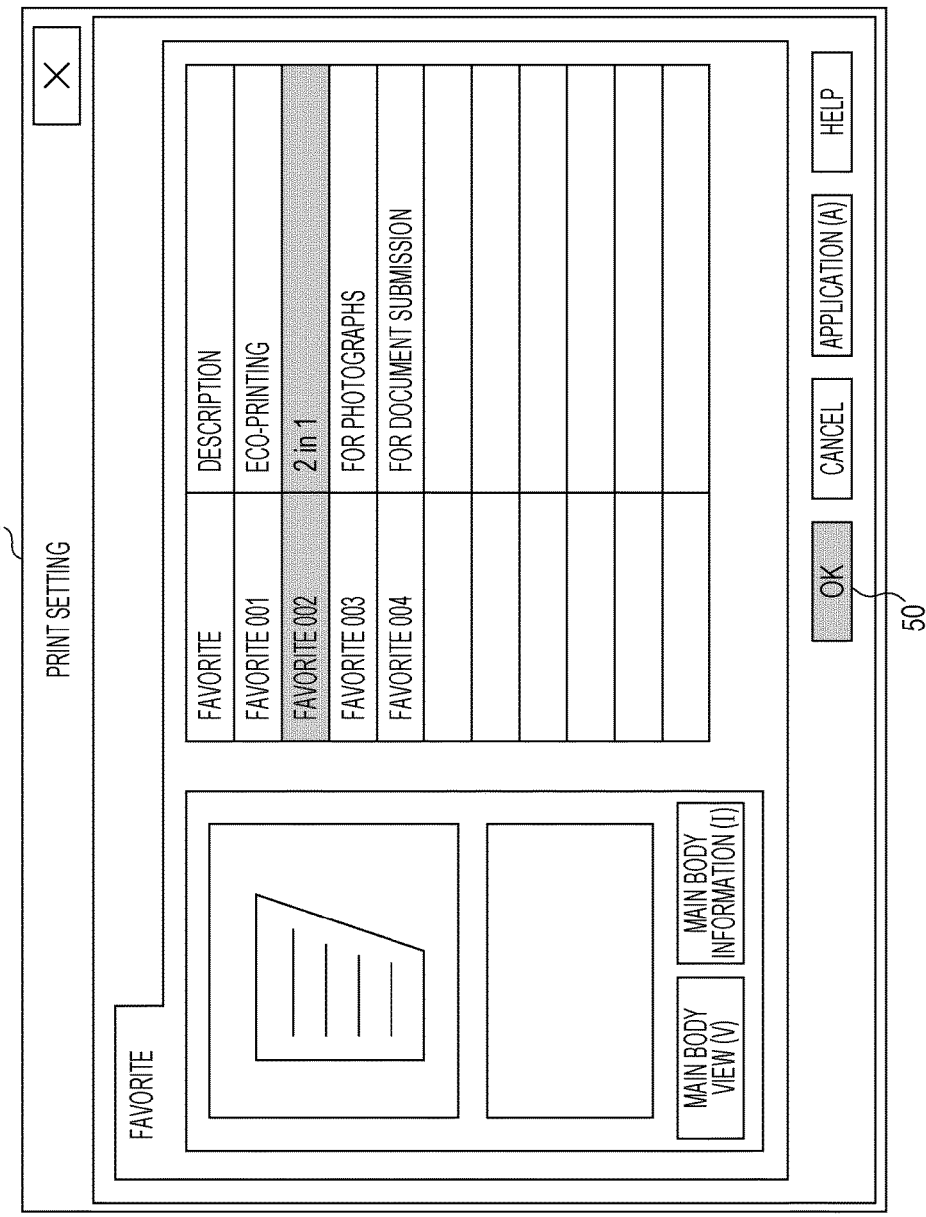
FIG. 4 is a display screen view illustrating a display example of a print setting screen displayed on the user PC.

FIG. 4 is a display screen view illustrating a display example of the print setting screen 5 displayed on the user PC 2. FIG. 4 illustrates a state in which a favorite menu screen on which the favorite function information is selectable is displayed, as the print setting screen 5. A plurality of types of the favorite function information can be held in the favorite setting holding unit 24, and all the types are displayed in the form of an easily selectable list on the favorite menu screen, as illustrated in FIG. 4. As the favorite function information, information of a favorite number and function description is displayed in the form of a list.

FIG. 4 illustrates an example in which the favorite function information of the favorite numbers 001 to 0004 is displayed. When any one of the favorite function information is selected in response to the operation of the input device by the user and a button icon 50 where "OK" is described in FIG. 4 is operated on the favorite menu screen illustrated in FIG. 4, detailed information of the selected favorite function information is displayed on the display of the user PC 2.

[Display Screen with Favorite Generation Tool]

Next, various display screens displayed when the administrator PC 1 generates the favorite function information, using the favorite generation tool 18 in the administrator PC 1 will be described.

FIG. 5 is a display screen view illustrating a display example of an information collection result table illustrating the setting information of the print functions of the image forming apparatuses 3 collected and acquired by the model information collection unit 181 and displayed by the print setting unit 182. In the information collection result table illustrated in FIG. 5, items of the collected setting information of the print functions indicated as "setting items" are displayed in the form of a list, and setting content corresponding to the setting items are displayed for each of the image forming apparatuses 3 indicated with model numbers "model 01" to "model 03". The information collection result table does not display the print function that cannot be used in any of the image forming apparatuses 3 to be managed.

In the example of FIG. 5, print functions such as an N in 1 function, a single-sided/double-sided function, a staple function, a punching function, a color setting function, an image quality function, and a toner saving function are collected and displayed as the "setting items". In each of the "model 01" to the "model 03", in the case of having the print function indicated by each item of the "setting item", a settable setting value is illustrated, and in the case of not having the print function indicated by each item, a symbol "-" indicating that the function is unavailable and a default value (for example, "OFF" in the case of not having the toner saving function) are illustrated.

In the example of FIG. 5, the "model 01" can use all the functions indicated in the setting items. In the "model 02, the single-sided/double-sided function, the punching function, and the toner saving function are unavailable. In the "model 03", the staple function, the color setting function, the image quality function, and the toner saving function are unavailable.

FIG. 6 is a display screen view illustrating a display example of a favorite function information candidate table illustrating candidates of the favorite function information for which selection of a combination of the favorite function information and specification of the setting values of the setting information have been made by the print setting unit 182 by the administrator. In the favorite function information candidate table illustrated in FIG. 6, the items selected by the administrator as the candidates from among the items of the setting information of the print functions illustrated in the information collection result table in FIG. 5 are displayed in the form of a list, and a "favorite name" such as "favorite 1" is further set. As for the items, information of the "setting value" and the specified function of the favorite such as information of "required/recommended" are selectable or inputtable on the basis of an operation of the input device 15 by the administrator.

As illustrated in FIG. 6, in the favorite function information candidate table, information of the setting value is inputtable and information for identifying whether each setting item is an item for which "required" is specified or an item for which "recommended" is specified are inputtable to the setting items, as a favorite specified function for each setting item.

The item for which "required" is specified specifies avoidance of display of the entire combination of the favorite function information including the item for which "required" is specified on the printer driver of the user PC 2, in the case where the setting item cannot be used in the image forming apparatus 3 and the print function of the setting item cannot be used on the printer driver of the user PC 2. For example, when the item for which "required" is specified cannot be used like the model 02 in FIG. 8, the entire display of the favorite 1 is not displayed. Meanwhile, the item for which "recommended" is specified specifies display of the entire combination of the favorite function information including the item for which "recommended" is specified on the printer driver of the user PC 2, and display with a default value indicating a function that can specify non-use of the setting item corresponding to the "recommended" specification, in the case where the setting item cannot be used in the image forming apparatus 3 and the print function of the setting item cannot be used on the printer driver of the user PC 2. For example, as illustrated in the model 03 in FIG. 8, in the case where the item for which "recommended" is specified, such as the staple function, cannot be used, the entire display of the favorite 1 is displayed, and the display is changed to the default value such as "OFF" indicating the function that can specify non-use of the staple function.

FIG. 7 is a display screen view illustrating a display example of a first favorite setting result information table illustrating whether the setting items of the favorite 1 are settable for the image forming apparatuses 3 as the favorite setting result information displayed by the favorite result display unit 183. In the first favorite setting result information table illustrated in FIG. 7, the print function indicated in each item of the "setting item" is illustrated by a setting value specific to each model or a default value depending on whether the print function is available without distinguishing the item for which "required" is specified and the item for which "recommended" is specified, for each of the "model 01" to the "model 03", corresponding to the setting content of the favorite function information candidate table illustrated in FIG. 6.

The administrator can judge how effectively the favorite function information set in the favorite function information candidate table in FIG. 6 is available to the image forming apparatuses 3 by confirming the first favorite setting result information table.

FIG. 8 is a display screen view illustrating a display example of a second favorite setting result information table illustrating whether the setting items of the favorite 1 are settable for the image forming apparatuses 3 as the favorite setting result information displayed by the favorite result display unit 183. In the second favorite setting result information table illustrated in FIG. 8, whether the favorite 1 is displayable is illustrated distinguishing the item for which "required" is specified and the item for which "recommended" is specified, and as for the "setting item" for which "recommended" is specified, the specified function corresponding to the print function is illustrated by the setting value specific to each model or the default value for specifying non-use depending on whether the item for which "recommended" is specified is available, for each of the "model 01" to the "model 03", corresponding to the setting content of the favorite function information candidate table illustrated in FIG. 6.

The administrator can judge whether the favorite function information set in the favorite function information candidate table in FIG. 6 is displayable in the image forming apparatuses 3 by confirming the second favorite setting result information table.

[Favorite Data Generation Processing with Favorite Generation Tool]

Figure 9:
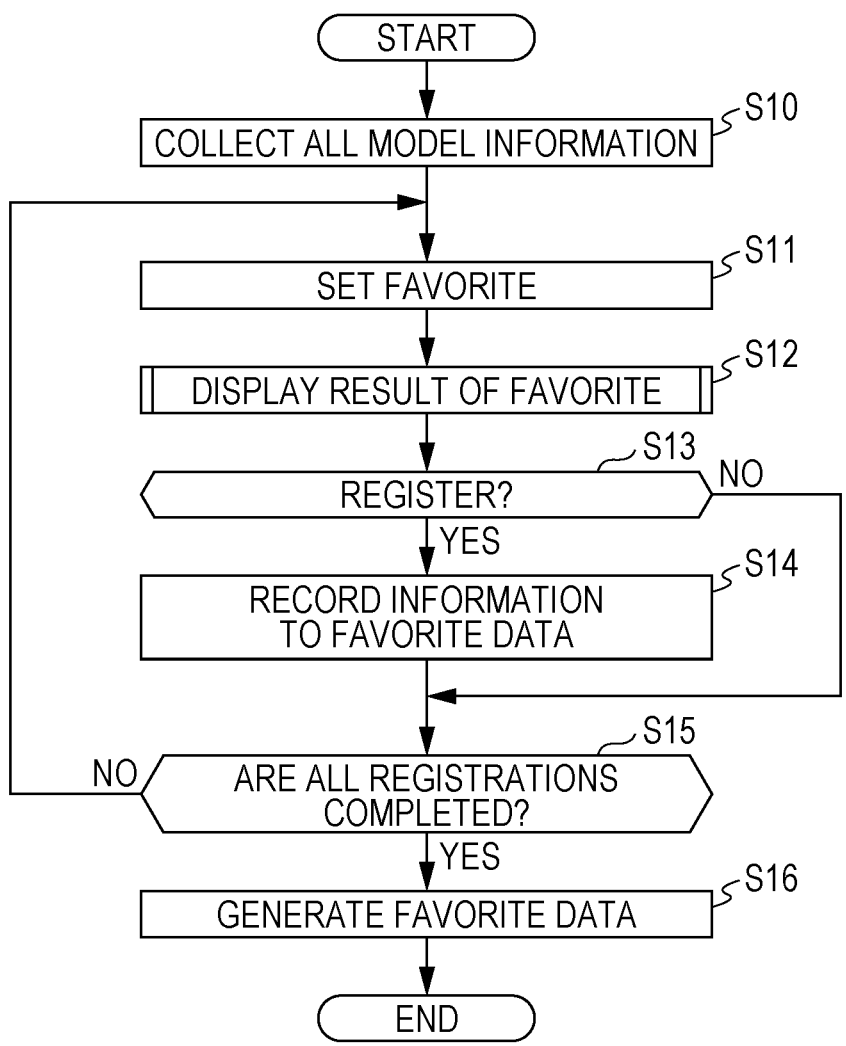
FIG. 9 is a flowchart illustrating an information processing program executed when generating favorite data with a favorite generation tool.
Figure 10:
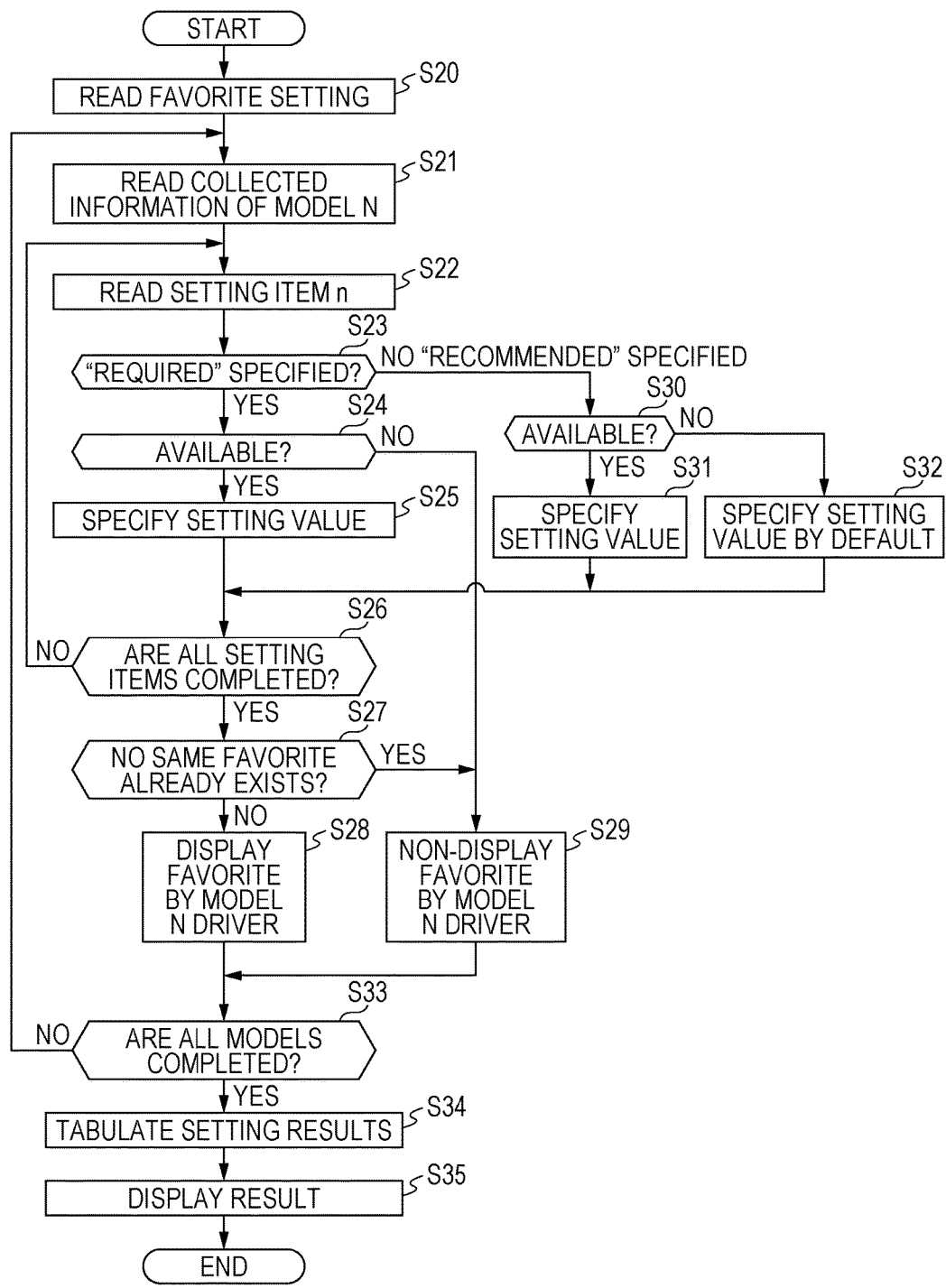
FIG. 10 is a flowchart illustrating an information processing program executed when generating favorite data with a favorite generation tool.

FIGS. 9 and 10 are flowcharts illustrating an information processing program executed when generating favorite data with the favorite generation tool 18 of the administrator PC 1.

Referring to FIG. 9, in step S10 (hereinafter, abbreviated as S10), the model information collection unit 181 communicates with all the image forming apparatuses 3 used by the user PCs 2 connected to the LAN 4 of the network system to be managed, and collects and acquires the setting information of the print functions about the image forming apparatuses 3 from the printer drivers 22.

Next, in S11, the print setting unit 182 makes specification of the setting values of the setting information of the displayed print functions possible on the basis of the operation of the input device 15 by the administrator, by displaying the information collection result table in FIG. 5 on the display device 16 on the basis of the setting information of the print functions collected and acquired by the model information collection unit 181. Then, in S11, as illustrated in favorite function information candidate table in FIG. 6, the print setting unit 182 specifies a combination of candidates of the print functions and the setting values of the setting information for the favorite function information, on the basis of the operation of the input device 15 by the administrator.

Next, in S12, the favorite result display unit 183 displays the favorite setting result information like the first favorite setting result information table in FIG. 7 and the second favorite setting result information table in FIG.

The detailed processing contents in S12 are illustrated as a subroutine in FIG. 10. Referring to FIG. 10, the favorite result display unit 183 executes the following processing. First, in S20, data of the combination of the candidates of the print functions and the setting values of the setting information for the favorite function information executed in S11 are read.

Next, in S21, information of the image forming apparatus 3 of a model N (N=01, 02, 03, and the like) collected in S10 is read. In S21, first, the information of the image forming apparatus 3 of the model 01 is read. Then, in S22, information of the n-th setting item (excluding the "favorite name") of the administrator is read from the combination of the candidates of the print functions and the setting values of the setting information for the favorite function information set in S11. In S22, first, the "setting value" and the information of "required/recommended" corresponding to the first setting item (in the example of FIG. 8, the setting value of the setting information of the administrator corresponding to the N in 1 function) are read.

Next, in S23, whether the n-th setting item by the administrator is "required" specification (or "recommended" specification) is determined on the basis of the information read in S21 and S22. In S24, whether the n-th setting item is available in the model N is determined when the "required" specification is determined in S23. In S25, the "setting value" corresponding to the n-th setting item is specified as the favorite setting result information when the n-th setting item is determined to be available in S24, and the processing proceeds to S26. On the other hand, when the n-th setting item is determined to be unavailable in S24, non-display of the favorite is specified as the favorite setting result information in S32, and the processing proceeds to S29.

Further, in S30, whether the n-th setting item is available (usable) in the model N is determined when no "required" specification is determined (the "recommended" specification is determined) in S23. In S32, the "setting value" corresponding to the n-th setting item is specified as the favorite setting result information when the n-th setting item is determined to be available in S30, and the processing proceeds to S26. On the other hand, when the n-th setting item is determined to be unavailable in S30, a default that can specify the unavailability is specified as the "setting value" corresponding to the n-th setting item, and the processing proceeds to S26.

In S26, whether the processing in S22 to S25 and S30 to S32 has been completed is determined for all the setting items of the model N. When it is determined that the processing has not been completed for all the setting items of the model N in S26, the processing returns to S22, and the information corresponding to the next item (the second setting item next to the first setting item) is read, and the processing in S22 to S25 and S30 to S32 is executed. On the other hand, when it is determined that the processing has been completed for all the setting items of the model N in S26, whether a combination of the favorite function information for which the same setting as the combination of the favorite function information set in S26 is set has already existed is determined in the printer driver on the basis of the setting information of the print functions corresponding to the model N collected in S10, in S27.

In S28, display of the favorite is specified as the favorite setting result information for the model N when it is determined that the combination of the favorite function information with the same setting has not already existed in S27, and the processing proceeds to S29. In S29, non-display of the favorite is specified as the favorite setting result information for the model N when it is determined that the combination of the favorite function information with the same setting has already existed in S27, and the processing proceeds to S33. The items determined or specified by the processing of S23 to S32 are stored as the information of the target model N.

In S33, whether the processing of S22 to S32 has been completed for all the models is confirmed. For example, as in the example of FIG. 5, in the case where the models to be managed are the "model 01" to the "model 03", completion of the processing for all the models is determined by completion of the processing of the "model 03". When incompletion of the processing for all the models is determined in S33, the processing returns to S21, and the information of the image forming apparatus 3 of the next model (for example, the "model 02" next to the "model 01") is read. In S21 to S32, similar processing is executed for the next models. On the other hand, when completion of the processing for all the models is determined in S33, setting results of the favorite functions are tabulated for all the models to be processed in S34. Then, in S35, the first favorite setting result information table illustrated in FIG. 7 and the second favorite setting result information table illustrated in FIG. 8 are displayed on the basis of a tabulation result in S34, and the present processing is terminated and the processing proceeds to S13 in FIG. 9.

In S13 in FIG. 9, after the first favorite setting result information table and the second favorite setting result information table are displayed, whether the registration operation by the operation of the input device 15 by the administrator who has confirmed the information of the tables has been made is determined. In S14, the favorite setting result information created by the administrator is registered (stored) to the favorite data of the storage device 14 as the favorite function information when the registration operation has been confirmed in S13, and the processing proceeds to S15. On the other hand, the processing proceeds to S15 when the registration operation has not been confirmed in S13.

In S15, whether registration of all the scheduled favorite function information has been completed is determined (S15). When incompletion of the registration of all the favorite function information is determined in S15, the processing returns to S11, and the above-described processing in S11 to S14 is repeatedly executed for unregistered favorite function information. Then when completion of the registration of all the favorite function information is determined in S15, favorite data for making the registered favorite function information usable is generated on the basis of the registered favorite function information (S16), and the processing is terminated. The favorite data generated in S16 is, for example, data in which the "setting item", the "setting value", and the "required/recommended" are associated, similar to the favorite function information candidate table illustrated in FIG. 6.

By execution of the information processing program illustrated in FIGS. 9 and 10, availability of each of the specified functions of the candidates of the set function setting item information in the plurality of models of image forming apparatuses 3 is displayed. Therefore, registration of the favorite function information that cannot be used in the image forming apparatus 3 to which the favorite function information is to be set can be prevented. Further, with the specification of the "required" and the "recommended" for the function setting item information, creation of unintended favorite function information and unnecessary favorite function information from can be prevented.

Since the setting items and the setting values of the favorite function information can be specified on the basis of the information collected via the network system, creation of the favorite function information can be made efficient. Further, since redundant registration is restricted for the already existing favorite function information, creation of unnecessary favorite function information from can be prevented.

[Another Example of Favorite Function Information]

Next, "favorite 2" will be described as another example of the favorite function information other than the above-described "favorite 1".

FIG. 11 is a display screen view illustrating a display example of a favorite function information candidate table according to another example of the favorite function information. FIG. 11 illustrates a favorite function information candidate table corresponding to the "favorite 2". Differences of the favorite function information candidate table in FIG. 11 from the favorite function information candidate table in FIG. 6 are that the item for which "recommended" is specified is set to two items of the "N in 1 function" and the "toner saving function", and specification content of the setting values are partially different.

FIG. 12 is a display screen view illustrating a display example of a first favorite setting result information table corresponding to the "favorite 2". In the first favorite setting result information table illustrated in FIG. 12, in the "model 01", all the setting items can be set to the setting values specified by the administrator. In the "model 02", the single-sided/double-sided function" cannot be set to the setting value specified by the administrator, and a default value is specified. In the "model 03", the "staple function", the "color setting function", and the "image quality function" cannot be set to the setting values specified by the administrator, and the default values are specified.

FIG. 13 is a display screen view illustrating a display example of a second favorite setting result information table corresponding to the "favorite 2". In the second favorite setting result information table illustrated in FIG. 13, in the "model 01" and the "model 02", all the items for which "required" is specified can be set to the setting values specified by the administrator, and the favorite 2 is displayable. In the "model 03", all the items for which "required" is specified can be set to the setting values specified by the administrator, but all the setting items are the same as the specification content of the "model 03" in the "favorite 1" illustrated in FIG. 8 and therefore the favorite 2 is undisplayable.

[Other Examples of Favorite Setting Result Information]

Next, other examples of the favorite setting result information displayed by the favorite result display unit 183 will be described. As the favorite setting result information, a favorite setting result information by type table illustrating the setting items of the candidates of the favorite function information by a plurality of types may be made displayable, in addition to the first favorite setting result information table in FIG. 7 and the second favorite setting result information table in FIG. 8.

FIG. 14 is a type classification table used when classifying setting items of favorite function information candidates into a plurality of types.

Referring to FIG. 14, type A is a type in which both the item for which "required" is specified and the item for which "recommended" is specified are available, the favorite display is displayable, and the specification of the setting values is displayable without being changed to default values. For example, the setting content of the model 01 illustrated in FIG. 12 corresponds to the type A.

Type B is a type in which the item for which "required" is specified is unavailable, the item for which "recommended" is specified is available or unavailable, and the favorite display is undisplayable.

Type C is a type in which the item for which "required" is specified is available, the item for which "recommended" is specified is unavailable, the favorite display is displayable, and specification of the unavailable item for which "recommended" is specified is changed to a default value and displayed. For example, the setting content of the model 02 illustrated in FIG. 12 corresponds to the type C.

Type D is a type in which the item for which "required" is specified is available, the item for which "recommended" is specified is available or unavailable, and the favorite display is undisplayable due to existence of the combination of the favorite function information with the same setting, like the "favorite 1", for example, in the printer driver. For example, the setting content of the model 03 illustrated in FIG. 12 corresponds to the type D.

FIG. 15 is a display screen view illustrating a favorite setting result information by type table illustrating the setting items of favorite function information candidates classified into a plurality of types. In the favorite setting result information by type table illustrated in FIG. 15, the number of the setting items of the candidates of the favorite function information are tabulated by a plurality of types of the type A to the type D illustrated in FIG. 14 for each favorite function information such as the "favorite 1" to the "favorite 3", and numerical data indicating the number of the setting items of the candidates of the favorite function information is displayed by the plurality of types on the basis of the tabulation result.

When the favorite setting result information by type table as illustrated in FIG. 15 is displayed, the administrator can recognize the number of the setting items of the candidates of the favorite function information by type of the favorite function information in registering the favorite function information. When the favorite setting result information by type table as illustrated in FIG. 15 is displayed, the "model 03" is configured by the type B and the type D and does not include the type A and the type C, and thus is the combination of the favorite function information unavailable in all the models. In such a case, the administrator cancels registration of the "model 03". In the case where the candidates of the favorite function information, which are the combination of the favorite function information unavailable in all the models, are included in the candidates of the favorite function information, a predetermined report may be made such as giving warning of the fact.

[Favorite Function Information Setting Processing on User PC]

Figure 16:
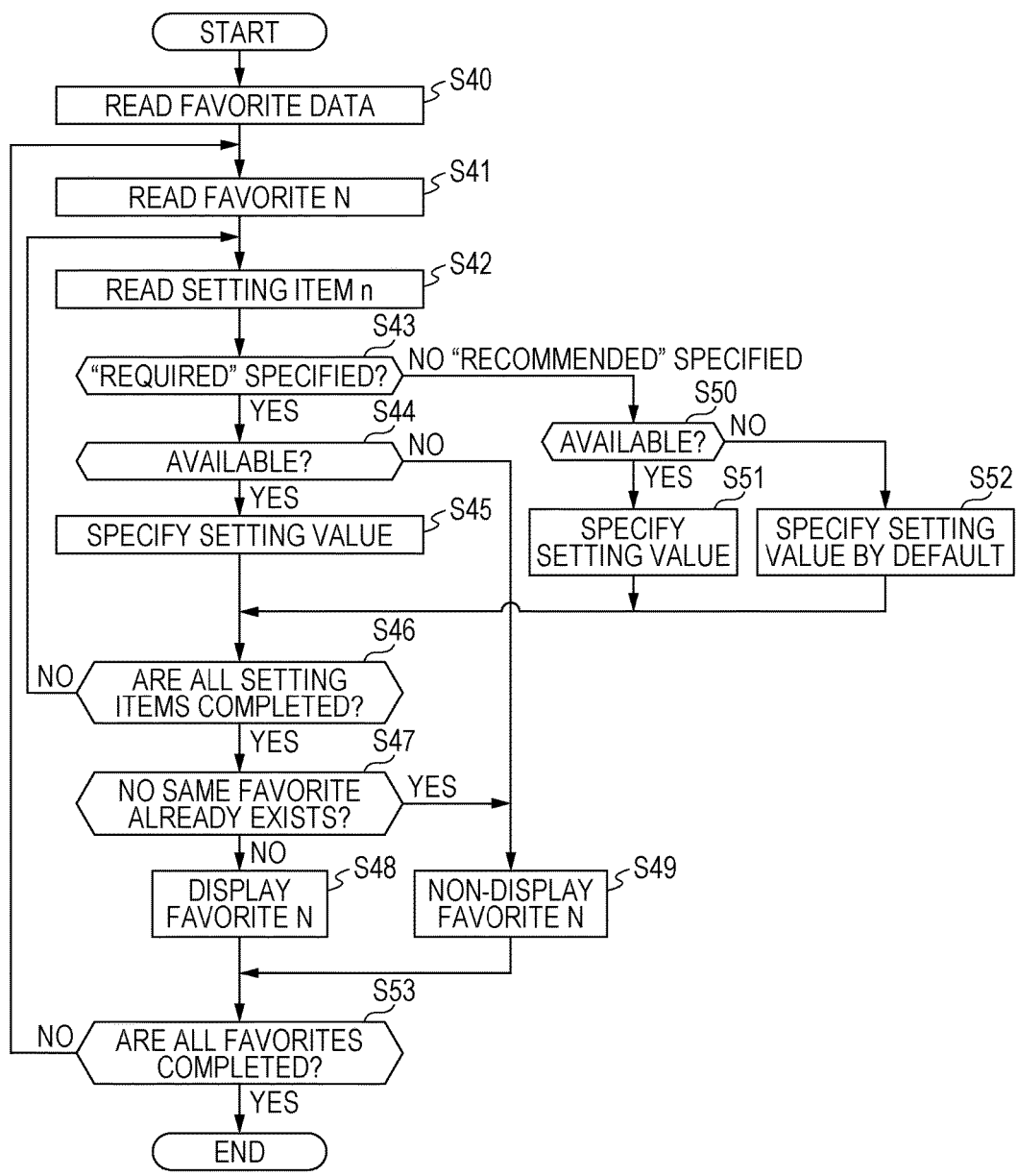
FIG. 16 is a flowchart illustrating an information processing program executed when setting favorite function information by a printer driver of the user PC.

FIG. 16 is a flowchart illustrating an information processing program executed when setting the favorite function information by the printer driver 22 of the user PC 2.

Referring to FIG. 16, in the case of setting the favorite data 19 generated by the administrator PC 1 to the user PC 2 as illustrated in FIG. 3, the printer driver 22 of the user PC 2 executes the following processing. First, in S40, the favorite data 19 received from the administrator PC 1 via the LAN 4 as illustrated in FIG. 3 is read.

Next, in S41, information of the favorite (N=01, 02, 03, and the like) is read from the favorite data (for example, data in which the "favorite name", the "setting item", the "setting value", and the "required/recommended" are associated as illustrated in FIG. 6) read in S40. In S41, first, the information of the favorite 1 is read. Then, in S42, the information of the n-th setting item (excluding the "favorite name") is read from the information read in S41. In S42, first, the "setting value" corresponding to the first setting item and the information of the "required/recommended" are read.

Next, in S43, whether the n-th setting item is "required" specification (or "recommended" specification) is determined on the basis of the information read in S41 and S42. In S44, whether the n-th setting item is available in the model corresponding to the printer driver is determined when the "required" specification is determined in S43. In S45, the "setting value" corresponding to the n-th setting item is specified as the favorite setting result information, corresponding to the n-th setting item of the model corresponding to the printer driver, when the n-th setting item is determined to be available in S44, and the processing proceeds to S46. On the other hand, when the n-th setting item is determined to be unavailable in S44, non-display of the favorite N is specified for the model corresponding to the printer driver in S59, and the processing proceeds to S49.

Further, in S50, whether the n-th setting item is available (usable) in the model corresponding to the printer driver is determined when no "required" specification is determined (the "recommended" specification is determined) in S43. In S51, the "setting value" corresponding to the n-th setting item is specified, corresponding to the n-th setting item of the model corresponding to the printer driver, when the n-th setting item is determined to be available in S50, and the processing proceeds to S46. On the other hand, when the n-th setting item is determined to be unavailable in S50, a default that can specify the unavailability is specified as the "setting value" corresponding to the n-th setting item, and the processing proceeds to S46.

In S46, whether the processing in S42 to S45 and S50 to S52 has been completed is determined for all the setting items of the favorite N. When it is determined that the processing has not been completed for all the setting items of the favorite N in S46, the processing returns to S42, and the information corresponding to the next item (the second setting item next to the first setting item) is read, and the processing in S42 to S45 and S50 to S52 is executed. On the other hand, when it is determined that the processing has been completed for all the setting items of the favorite N in S46, whether a combination of the favorite function information for which the same setting as the combination of the favorite function information set in S46 is set has already existed is determined in the printer driver in S47.

In S48, display of the favorite N is specified for the model corresponding to the printer driver when it is determined that the combination of the favorite function information with the same setting has not already existed in S47, and the processing proceeds to S49. In S49, non-display of the favorite N is specified for the model corresponding to the printer driver when it is determined that the combination of the favorite function information with the same setting has already existed in S47, and the processing proceeds to S53.

In S53, whether the processing of S42 to S52 has been completed for all types of favorites is confirmed. For example, in the case where the types of the favorites are the "favorite 1" to the "favorite 3", completion of the processing for all types of favorites is determined by completion of the processing of the "favorite 3". When incompletion of the processing for all types of favorites is determined in S53, the processing returns to S41, information of the next favorite (for example, the "favorite 2" next to the "favorite 1") is read, and similar processing is executed for the next favorite in S41 to S52. On the other hand, when completion of the processing for all types of favorites is determined in S53, the processing is terminated. The favorite function information set by the processing in FIG. 16 is stored (held) in the favorite setting holding unit 24, and becomes usable in the printer driver 22.

By execution of the processing illustrated in FIG. 16, the favorite function information similar to that displayed in the administrator PC 1 as illustrated in FIGS. 8 and 13 is displayed in the printer driver 22 of the user PC 2.

The favorite function information setting processing in the user PC as illustrated in FIG. 16 may be executed in such a manner that the favorite data 19 is simultaneously transmitted from the administrator PC 1 to a plurality of the user PCs 2 and the processing is simultaneously executed in the user PCs 2, or the favorite data 19 is transmitted in a predetermined order from the administrator PC 1 to a plurality of the user PCs 2 and the processing is executed in order in the plurality of user PCs 2.

By execution of the information processing program illustrated in FIG. 16, the favorite function information can be collectively set to the user PCs. Therefore, the processing of setting the favorite function information can be made efficient.

[Example of Setting Favorite Function Information of Only Specific Model]

Next, an example of setting the favorite function information of only a specific model in the image forming apparatus 3 will be described. FIG. 17 is a view illustrating setting items of favorite function information when setting favorite function information of only a specific model. FIG. 18 is a view illustrating a second favorite setting result information table of favorite function information when setting favorite function information of only a specific model.

To set the favorite function information of only a specific model in the image forming apparatus 3, an item "model" is added to the setting item of the favorite function information, information that can identify a model such as the "model 01" is specified as the setting value for the information of the "model", and information of "required" may just be specified for the information of "required/recommended", as illustrated in FIG. 17. By use of the information of the setting items of the favorite function information as illustrated in FIG. 17, the favorite setting result information of when setting the favorite function information of only a specific model such as the favorite function information of only the "model 01" as illustrated in FIG. 18 can be displayed and used in the administrator PC 1 and the user PC 2.

In doing so, the favorite function information corresponding to a specific model of image forming apparatus can be provided.

[Example of Setting Favorite Function Information of Only Specific User]

Next, an example of setting favorite function information of only a specific user like a specific user group will be described. FIG. 19 is a view illustrating setting items of favorite function information when setting favorite function information of only a specific user.

To set the favorite function information of only a specific user, an item "user" is added to the setting item of the favorite function information, information that can identify a user such as a "group A member" is specified as the setting value for the information of the "user", and information of "required" may just be specified for the information of "required/recommended", as illustrated in FIG. 19. By use of the information of the setting items of the favorite function information as illustrated in FIG. 19, the favorite setting result information of when setting the favorite function information of only a specific user such as the favorite function information of only the "group A member" can be displayed and used in the administrator PC 1 and the user PC 2. In the case of setting the favorite function information of only a specific user, only a plurality of users may be targeted or only one user may be targeted.

In doing so, the favorite function information that tends to be used by a specific user can be provided.

[Other Configuration Examples]

Although the MFP has been described as an example of the image forming apparatus 1, the present invention is not limited to the example, and another image forming apparatuses such as a copying machine, a printer, or a facsimile machine may be used.

The setting of the favorite function information to the printer driver 22 of the user PC 2 illustrated in FIG. 16 is not limited to the communication of information via the LAN 4, and the favorite data may be read from the administrator PC 1 to the user PC 2, using a recording medium such as a USB.

As the method of collecting the setting information of the image forming apparatus in the information processing program illustrated in FIGS. 9 and 10, a method of manually inputting information by the administrator may be used.

The method of displaying the information such as the setting items and the setting values in the information processing program illustrated in FIGS. 9 and 10 is not limited to the form of a list, and display by user interface (UI) display similar to the printer driver may be executed. Further, all the setting items maybe written to data such as CSV and the data in which the setting values are written by the administrator may be read, rather than the UI display.

The function of the favorite generation tool 18 in the administrator PC 1 may be executed by a printer driver. Further, regarding the function of the favorite generation tool 18, a function to add favorite function information common to all the models is provided in a universal printer driver (UPD), and the various types of processing such as confirmation of the favorite function information may be executed in the function. Further, a function similar to the favorite generation tool 18 may be executed by a printer driver individually provided to each model, instead of the universal printer driver.

The scope of the present invention is defined not by the above description but by the claims, and it is intended that all modifications within the meaning and scope equivalent to the claims are included. In addition, the inventions described in the embodiments and modifications are intended to be implemented alone or in combination as much as possible.

Although embodiments of the present invention have been described and illustrated in detail, the disclosed embodiments are made for purposes of illustration and example only and not limitation. The scope of the present invention should be interpreted by terms of the appended claims and it is intended that all modifications within the meaning and scope equivalent to the claims are included. In addition, the inventions described in the embodiments and modifications are intended to be implemented alone or in combination as much as possible.

What is claimed is:

1. An information processing apparatus capable of setting favorite function information in an image forming apparatus, the information processing apparatus comprising a processor, a display, a storage device, and a non-transitory storage medium, the non-transitory storage medium storing a program comprising a plurality of instructions which, when the processor executes the instructions, perform the following:

collecting function setting item information from a plurality of models of image forming apparatuses;

selecting combinations of candidates of the function setting item information to be included in the favorite function information from the collected function setting item information and setting a specified function to each of the selected candidates of the function setting item information;

displaying availability in the plurality of models of image forming apparatuses, of each of the specified functions of the candidates of the selected function setting item information, wherein responsive to selection of either required item information or recommended item information for each of the combinations of the candidates of the function setting item information, the displaying does not display the combination of the candidates of the function setting item information, of an image forming apparatus in which the function setting item information specified as the required item information is unavailable, of the plurality of models of image forming apparatuses, and changes the specified function of the function setting item information specified as the recommended item information to a specifiable function and displays the changed function, of an image forming apparatus in which the function setting item information specified as the recommended item information is unavailable, of the plurality of models of image forming apparatuses; and storing, as favorite setting information to be set as the favorite function information in the plurality of models of image forming apparatuses, a combination of allowed candidates, of the combinations of the candidates of the function setting item information to which the displayed specified functions have been set.

2. The information processing apparatus according to claim 1, wherein the program comprises further instructions which, when the processor executes the instructions, perform the following:

specifying a specific model of image forming apparatus from the plurality of models of image forming apparatuses and selecting a combination of candidates of the function setting item information, displaying the availability of each of the specified functions of the function setting item information, targeting the specific model of image forming apparatus specified by the candidate selector, and storing the combination of allowed candidates as the favorite setting information to be set as the favorite function information in the specific model of image forming apparatus specified by the candidate selector.

3. The information processing apparatus according to claim 1, wherein the program comprises further instructions which, when the processor executes the instructions, perform the following:

specifying a user of the plurality of models of image forming apparatuses and selecting a combination of candidates of the function setting item information, displaying the availability of each of the specified functions of the function setting item information, targeting an image forming apparatus used by the user specified by the candidate selector, and storing the combination of allowed candidates as the favorite setting information to be set as the favorite function information in the image forming apparatus used by the user specified by the candidate selector.

4. An information processing method executed in an information processing apparatus capable of setting favorite function information in an image forming apparatus, the information processing method comprising:

collecting function setting item information from a plurality of models of image forming apparatuses;

selecting combinations of candidates of the function setting item information to be included in the favorite function information from the collected function setting item information and setting a specified function to each of the selected candidates of the function setting item information;

displaying availability in the plurality of models of image forming apparatuses, of each of the specified functions of the function setting item information to which the specified functions have been set, wherein responsive to selecting either required item information or recommended item information for each of the combinations of the candidates of the function setting item information, the displaying does not display the combination of the candidates of the function setting item information, of an image forming apparatus in which the function setting item information specified as the required item information is unavailable, of the plurality of models of image forming apparatuses, and changes the specified function of the function setting item information specified as the recommended item information to a specifiable function and displays the changed function, of an image forming apparatus in which the function setting item information specified as the recommended item information is unavailable, of the plurality of models of image forming apparatuses; and storing, as favorite setting information to be set as the favorite function information in the plurality of models of image forming apparatuses, a combination of allowed candidates, of the combinations of the candidates of the function setting item information to which the displayed specified functions have been set.

* * * * *